R. STEEL.
Velocipede.

No. 221,255.  Patented Nov. 4, 1879.

Witnesses.
Thomas J. Bewley.
Chas. N. Vollum.

Inventor
Robert Steel.
per Stephen Ustick, Attorney.

R. STEEL.
Velocipede.

No. 221,255. Patented Nov. 4, 1879.

Witnesses.
Thomas J. Bewley.
Chas. N. Vollum.

Inventor
Robert Steel.
per Stephen Ustick, Attorney.

UNITED STATES PATENT OFFICE.

ROBERT STEEL, OF PHILADELPHIA, PENNSYLVANIA, ASSIGNOR OF ONE-HALF OF HIS RIGHT TO GODFREY REBMANN AND HENRY RUHLAND, OF SAME PLACE.

IMPROVEMENT IN VELOCIPEDES.

Specification forming part of Letters Patent No. 221,255, dated November 4, 1879; application filed October 2, 1879.

*To all whom it may concern:*

Be it known that I, ROBERT STEEL, of the city and county of Philadelphia, in the State of Pennsylvania, have invented a new and useful Improvement in Hand-Propelling Road-Carriages, of which the following is a specification.

The nature of my invention consists in the combination of a hand-lever wheel with the front axle of a carriage by means of cog-gearing, and with the seat of the rider, the wheel being at the middle of the axle, and the latter having a swivel-connection with the front end of a central reach, the rear end of which is connected with the rear axle. The seat is supported by means of upright rods or springs, which are connected to the rear axle, and a bow connected with the rear axle and said reach, the bow serving for a foot-rest. This construction of the carriage makes the propelling and steering of it very convenient to the rider, the hand-levers of the wheel being directly in front of him, by which arrangement he is enabled to exert all the power of his arms in propelling the vehicle to the best advantage, and is also enabled to steer with the greatest ease and convenience without interfering with the forward movement, as he has merely to vary the position of the wheel laterally, which is effected by the swivel movement of the front axle, with which the wheel is connected, as above described. The wheel is of large size, and the levers project from its rim any convenient distance, and the pinions on the axle, which engage with a toothed rim on each side of the wheel, as hereinafter fully described, are of small diameter, whereby a rapid movement may be given to the traction-wheels on said axle, to accomplish great speed of the carriage with but a moderate movement of the hands of the rider when desired.

Figure 1:
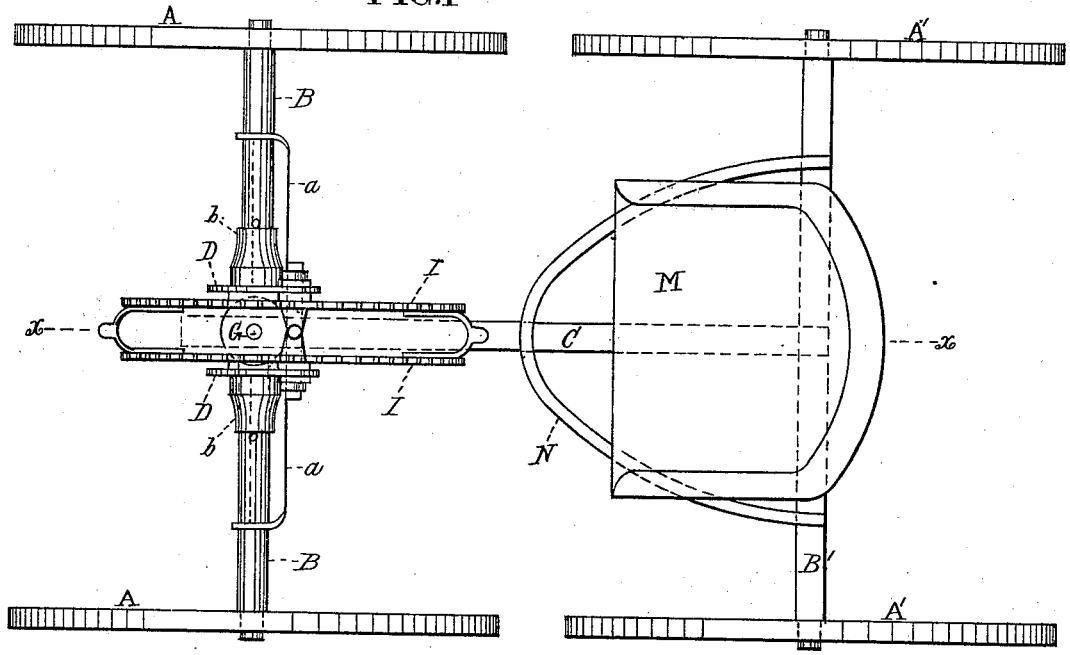
Figure 2:
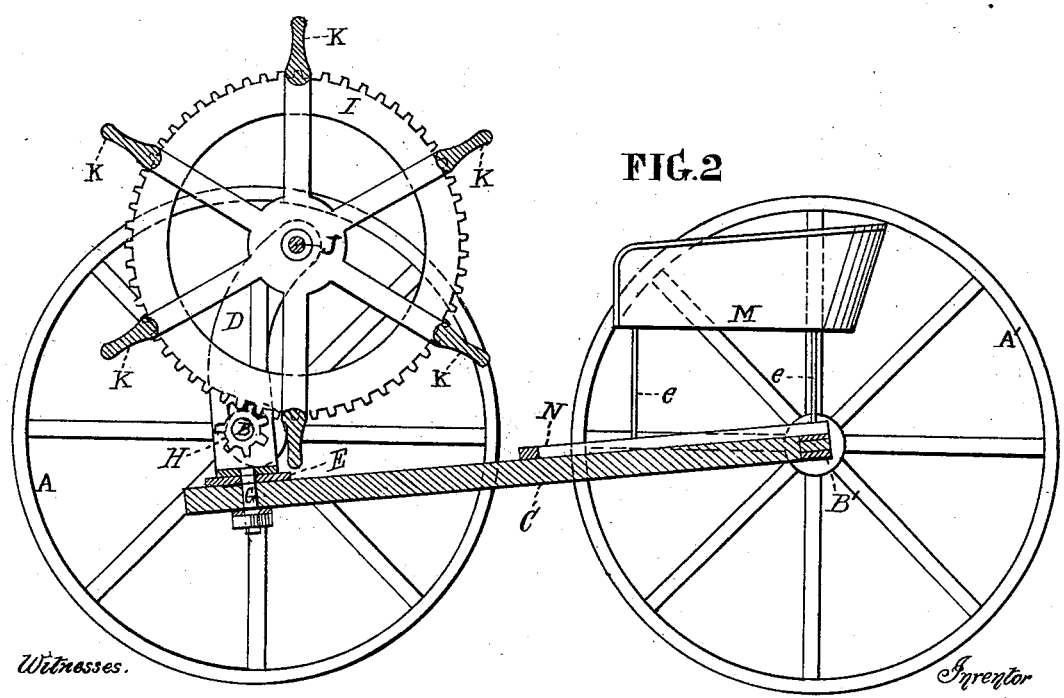
Figure 3:
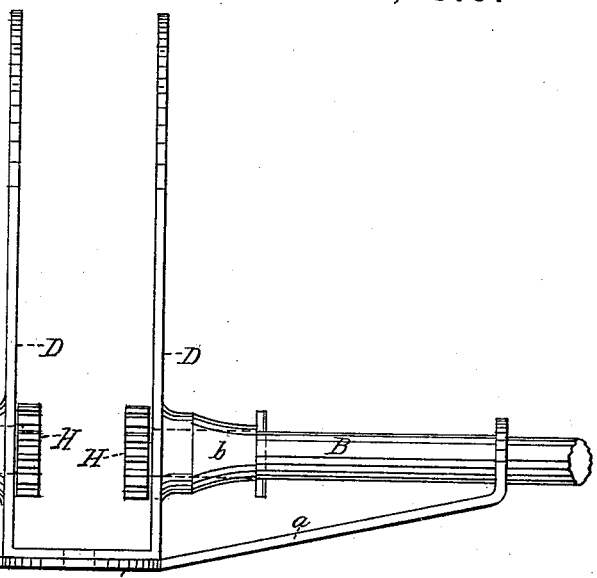
Figure 4:
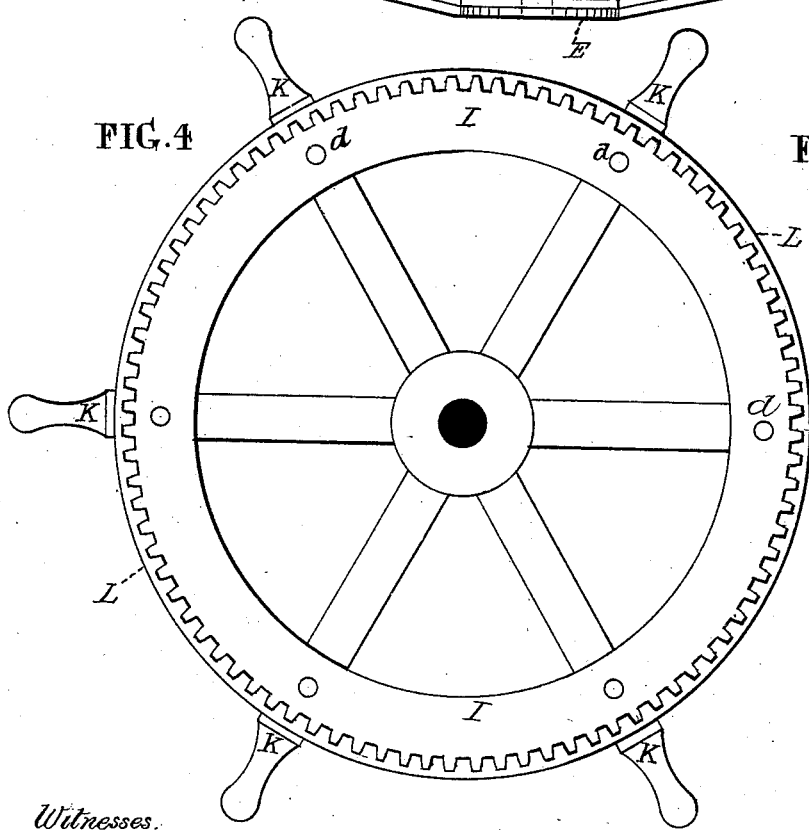
Figure 5:
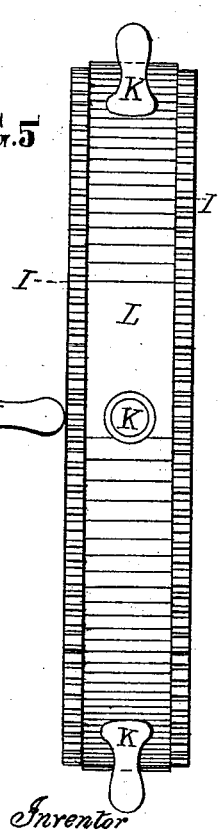

In the accompanying drawings, which make a part of this specification, Figure 1 is a plan view of my improved carriage. Fig. 2 is a longitudinal section at the dotted line $x\ x$ of Fig. 1. Fig. 3, Sheet No. 2, is a front elevation of the yoke D, in connection with the sections B B of the front axle, on an enlarged scale. Fig. 4 is a side view of the wheel I I, showing a modification in its construction. Fig. 5 is an edge view of the same.

Like letters of reference in all the figures indicate the same parts.

A A and A' A' represent the traction-wheels of my improved carriage. B B are sections of the front axle, and B' the rear axle. C is a central longitudinal reach, permanently connected at one end with the rear axle, B', and at its other end it has a swivel-connection with the sections B B of the front axle by means of the yoke D, swivel-plate E, and pin G. The swivel-plate has a permanent connection with the base of the yoke, and is provided with arms $a\ a$, the bent ends of which have bearings for the axle-sections B B near the traction-wheels A A, the inner ends of these sections having bearings in the hubs $b\ b$ of the yoke.

On the extreme inner end, inside of the yoke, are pinions H H, which gear into the toothed wheels I I on the horizontal shaft J, which has bearings in the arms of the yoke. There are radial hand-levers K, the inner ends of which are bifurcated and are permanently connected with the spokes of the gear-wheels I I.

The yoke D is clearly shown in connection with the sections B B of the front axle in Fig. 3.

I do not confine myself to the mode above described of confining the hand-levers K to the gear-wheels, as other modes may conveniently be adopted, one of which is shown in Figs. 4 and 5, in which L is a rim, which may be made of wood, and confined between the wheels I I by means of bolts or rivets $d$.

M is the rider's seat, which in the drawings is represented as supported by means of upright rods $e$, that project upward from the rear axle, B', and the bow N, the middle part of which has a permanent connection with the reach C, and the ends with the rear axle.

I claim as my invention—

1. The combination of the hand gear-wheels I I and pinions H H with the front axle sections, B B, and seat M, the wheels being centrally arranged between the traction-wheels A A, and having hand-levers K, whereby the carriage is under the complete control of the rider, and is readily steered without interrupting the forward movement of the carriage, substantially as set forth.

2. The central yoke, D, having arms $a$ $a$ and hubs $b$ $b$, in combination with the front axle-sections, B B, and hand-lever wheels I I, substantially as set forth.

ROBERT STEEL.

Witnesses:
STEPHEN USTICK,
THOMAS J. BEWLEY.